Patented Nov. 1, 1932

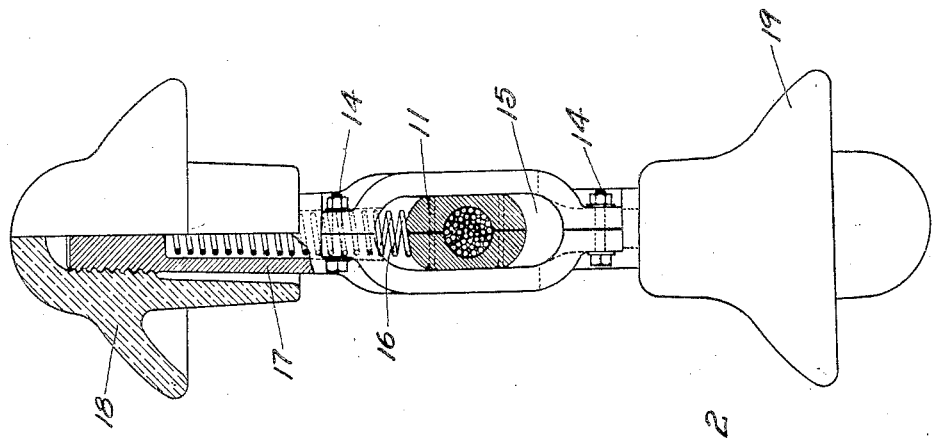
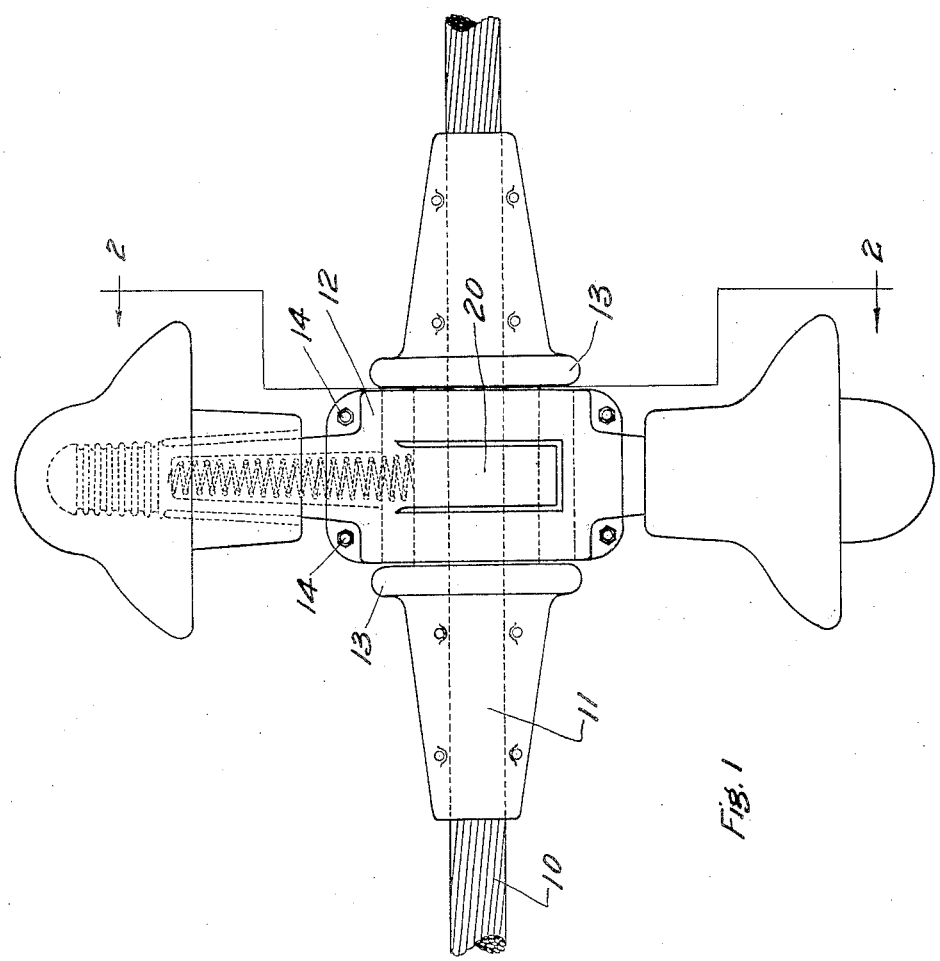

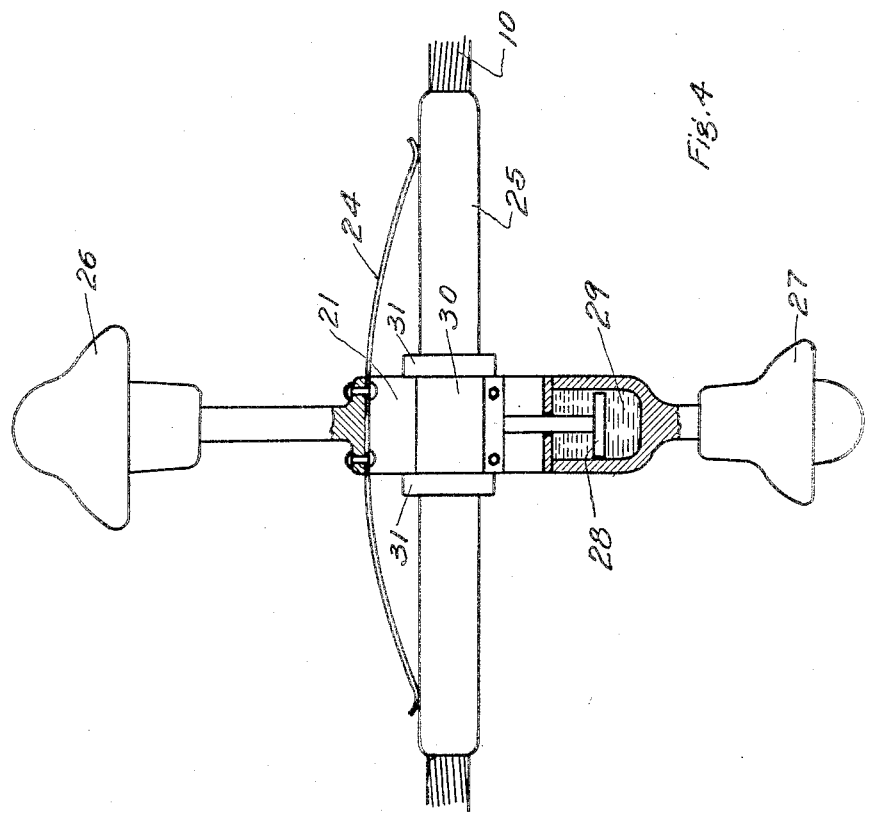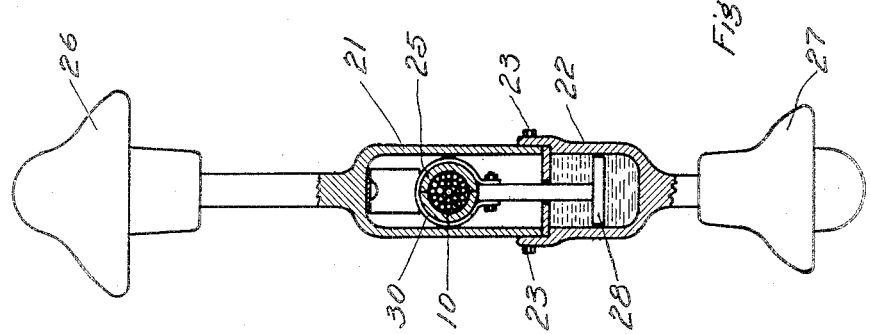

1,885,504

UNITED STATES PATENT OFFICE

ARTHUR O. AUSTIN, OF NEAR BARBERTON, OHIO, ASSIGNOR, BY MESNE ASSIGNMENTS, TO THE OHIO BRASS COMPANY, OF MANSFIELD, OHIO, A CORPORATION OF NEW JERSEY

TRANSMISSION LINE

Application filed March 1, 1928. Serial No. 258,445.

This invention relates to electrical transmission lines and has for one of its objects the provision of means for reducing vibration in supported strands or conductors. A further object is to provide a combined dampening device and a flux control member. A further object is to provide an apparatus of the class named which shall be of improved construction and operation. Other objects and advantages are apparent from the following description.

The invention is exemplified in the combination and arrangement of parts shown in the accompanying drawings and described in the following specification and it is more particularly pointed out in the appended claims.

In the drawings:

Fig. 1 is an elevation of a conductor having one embodiment of the present invention applied thereto.

Fig. 2 is a section on line 2—2 of Fig. 1.

Fig. 3 is an elevation partly in section showing one modification of the invention.

Fig. 4 is an elevation with parts in section looking from the right in Fig. 3.

In building high voltage transmission lines, it is desirable to string the conductors at a high tension so that the number of supports may be reduced or ample ground clearance be provided. It is also desirable to maintain sufficient tension in the conductor so that danger of the conductors swinging together will be less for a given spacing or separation. As the tension increases, trouble from vibration, which tends to destroy the conductor or attachments, seems to increase. The tension, mass and size of the conductor are apparently factors in setting up this vibration. In some cases, the conductor has been seriously damaged in a comparatively short time due to this vibration. The vibration, in general, is in a vertical direction and is apparently caused by the action of wind upon the conductor.

The amount of energy maintaining the vibration is usually very small. Therefore, any slight absorption of energy produced by the oscillation or vibration of the conductor will suffice to dampen it out or maintain it within safe bounds. While it is possible that a change of mass in the conductor may change the oscillation materially, the only sure means of limiting an oscillation is through an absorption of energy. If, therefore, any attachment having suitable mass is applied to the conductor so that the oscillation of the conductor will tend to cause a movement with respect to this mass so that energy will be dissipated, the oscillation may be kept within safe bounds or eliminated. In general, it is advisable to apply the oscillation or vibration absorber in the vicinity of the insulator or tower. Where this is done, however, any change in the size of the conductor usually results in a much lower flash-over voltage due to concentration of electrostatic stress upon the projecting parts. In my present invention, it is desired not only to absorb energy due to vibration but also to prevent the vibration damper or absorber from lowering the flash-over voltage.

In the form of the invention shown in Figs. 1 and 2, a conductor 10 is provided with a sleeve 11 clamped, pressed or otherwise secured to the conductor at any desired point thereon. A rider 12 is placed over the conductor at the sleeve or saddle 11. The sleeve or saddle 11 may be provided with beads or ridges 13 to keep the rider 12 in place. The rider may be made in two parts, clamped together by bolts 14 to permit assembling of the same upon the saddle 11. The rider has an oblong or oval opening 15 through which the saddle 11 extends and which permits relative vertical movement of the saddle and rider. The rider is held in mid position by a spring 16 which bears on the saddle 11 and lifts the rider free of the saddle. Where the conductor will not turn upon its axis under operating conditions, the saddle 11 and oblong opening 15 will serve to support the rider in its upright position. The spring 16 is engaged in an opening in an upwardly projecting pin 17 which supports an insulator 18 at its upper end. The pin and insulator constitute a flux control member which shields the saddle and rider and prevents them from decreasing the flash-over voltage of the conductor. Where the conductor is likely to turn, an additional control member 19 may be suspended below the conductor to counterbalance the upwardly extending control and assist in keeping the rider in its proper upright position. The proper position may be assured either by extending the support for the lower control member 19 downwardly a greater distance than the support 17 projects upwardly or by increasing the weight of the lower control member so that it will form a counterpoise to hold the parts in an upright position.

If the conductor tends to vibrate, the spring 16 which is just strong enough to float the rider with its control member, will offer little resistance to the relative motion between the conductor and saddle 11 and the rider 12. The rider 12 is provided with some suitable device for yieldingly resisting vertical vibration of the saddle 11. In the drawings this is shown in the form of spring tongues 20 struck from the sides of the rider 12 and bearing against the faces of the saddle 11. Whenever the saddle vibrates relative to the rider, the spring tongues 20 will absorb the energy of vibration of the conductor and tend to dampen out the oscillation or vibration.

Friction members 20 may be replaced by a dash pot or other suitable retarding means for absorbing the energy of vibration of the conductor. One such arrangement is shown in Figs. 3 and 4. In the form shown in these figures, the rider comprises an upper yoke 21 and a lower housing 22 which may be formed separately and secured together by bolts 23. A leaf spring 24 is carried by the yoke 21 and bears upon the saddle or sleeve 25 secured to the conductor 10. The spring 24 will support the rider with its insulated controls 26 and 27 so that the conductor may vibrate vertically within the yoke 21. Vibration of the conductor will meet with frictional resistance due to the contact between the spring 24 and the saddle 25. This frictional resistance will absorb the energy of vibration and tend to dampen out the movement. Further dampening may be effected by means of a piston 28 attached to the saddle 25 and reciprocating in a cylinder 29 formed by the housing 22. The cylinder 29 is provided with oil or other suitable material so that the piston and cylinder constitute a dash pot for snubbing the vibration of the conductor 10.

In this case the sleeve 25 is cylindrical to permit relative rotation of the rider and conductor so that the rider may always maintain an upright position irrespective of rotation of the conductor. The piston 28 is attached to the sleeve by means of a strap or collar 30 which is rotatably mounted on the sleeve between ribs 31. The ribs 31 overlap the sides of the yoke 21 to prevent displacement of the rider along the conductor.

In both the form shown in Figs. 1 and 2 and that shown in Figs. 3 and 4, the rider with its insulated controls will have sufficient inertia so that it will remain substantially stationary during vertical vibration of the conductor. This will produce relative movement of the parts of the snubbing mechanism so that the vibration will be dampened out. It is evident that the form of snubbers shown in the drawings can be located at any position along the line wherever they will be most effective in dampening out the vibrations. While the snubbers may be used without the insulated controls, there is a decided advantage in using the controls as the flash-over voltage is not reduced and the controls may be made to serve the double function of regulating the electrostatic field and, at the same time, supply inertia for operating the energy absorbing devices.

It will be apparent that either form of snubber described may be located at any position along the conductor since they are supported entirely by the conductor. This makes it possible to locate the snubbers at the points where they will be most effective. By observing a line, it is usually possible to tell where the amplitude of vibration is greatest and locate the snubbers at these points.

I claim:

1. The combination with a conductor of a rider mounted on said conductor, said conductor being movable vertically relative to said rider, a spring for floating the weight of said rider on said conductor and frictional means for resisting movement of said conductor relative to said rider.

2. The combination with a conductor of a rider mounted on said conductor between the ends thereof and entirely supported by said conductor, said conductor being movable relative to said rider, energy dissipating means for yieldingly resisting movement of said conductor relative to said rider, said rider having a portion thereof extending away from said conductor and an insulating covering for the extremity of said extending portion.

3. The combination with a conductor of a bearing member fixed to said conductor, a rider movably mounted on said conductor and supported entirely thereby, said rider having frictional yielding engagement with said bearing member to dissipate energy and dampen vibrations of said conductor.

4. The combination with a conductor of a sleeve or saddle fixed to said conductor, a rider having an opening therethrough for receiving said saddle, said opening having greater extent vertically than said saddle to permit vertical movement of said saddle in said opening, a spring for supporting the weight of said rider and frictional means for opposing relative movement of said saddle and rider.

5. The combination with a conductor having a saddle fixed thereto, a rider having an opening for receiving said saddle, said saddle being movable vertically in said opening, a spring for floating said rider on said saddle, an upwardly extending projection on said rider and an insulator supported at the upper end of said projection.

6. The combination with a conductor of a saddle fixed to said conductor, a rider mounted on said saddle, said saddle being movable vertically relative to said rider, a spring for floating said rider on said saddle, said rider having a portion thereof extending outwardly from said conductor, and a weight carried by said extending portion, said weight being formed of dielectric material and covering the extremity of said extending portion to oppose electrical discharge from said extending portion.

7. The combination with a conductor of a saddle fixed to said conductor, a rider having an opening therethrough for receiving said saddle, said saddle and opening being fitted together to prevent rotation of said rider about said conductor but permitting relative vertical movement of said rider and saddle, and yielding means for resisting relative vertical movement between said saddle and rider.

8. The combination with a conductor of a rider mounted on said conductor and moving vertically relative thereto, and yielding means for resisting relative vertical movement of said conductor and rider, said rider being weighted to retain the same in upright position on said conductor.

9. The combination with a conductor of a saddle fixed to said conductor, a rider having an opening therethrough for receiving said saddle, said saddle being vertically movable in said opening, a spring for floating said rider on said saddle, upwardly and downwardly extending projections on said rider and insulators mounted on the ends of said projections.

10. The combination with a conductor of a saddle fixed to said conductor, a rider having an opening therethrough for receiving said saddle, said saddle being vertically movable in said opening, a spring for floating said rider on said saddle, and a resilient member on said rider arranged to bear on said saddle and provide frictional resistance to relative movement between said saddle and rider.

11. The combination with a conductor, of a rider floated on said conductor and movable relative thereto, and a dash pot for damping relative movement of said rider and said conductor.

12. The combination with a conductor having a saddle fixed thereto, a rider movably mounted on said saddle, and a bar spring for floating said rider on said saddle, said bar spring having frictional engagement with said saddle for resisting relative movement between said saddle and rider.

13. The combination with a cable and a steadier therefor, of a dash pot connected between said cable and said steadier and operated by transverse movement of said cable for damping such movement.

14. The combination with a conductor and a steadier therefor, of a spring supported by said steadier and having movable frictional engagement with said conductor for damping movement of said conductor by said frictional engagement.

In testimony whereof I have signed my name to this specification this 28th day of February, A. D. 1928.

ARTHUR O. AUSTIN.